US005340277A

United States Patent [19]

Whitaker

[11] Patent Number: 5,340,277

[45] Date of Patent: Aug. 23, 1994

[54] CONTROLLER FOR REMOTE CONTROL CEILING FAN

[75] Inventor: Louis G. Whitaker, Alliance, Ohio

[73] Assignee: The Genie Company, Alliance, Ohio

[21] Appl. No.: 56,196

[22] Filed: May 3, 1993

[51] Int. Cl.[5] .............................................. F03D 11/00

[52] U.S. Cl. .................................... 416/5; 340/825.72

[58] Field of Search .......... 416/5; 340/825.69, 825.72, 340/825.52

[56] References Cited

U.S. PATENT DOCUMENTS

D. 282,462 2/1986 Hart .
D. 329,226 9/1992 Holbrook .
4,155,015 5/1979 Nakasane et al. .
4,251,812 2/1981 Okada .
4,322,632 3/1982 Hart et al. .
4,322,718 3/1982 Faierstein .
4,329,678 5/1982 Hatfield .
4,350,903 9/1982 Jimerson et al. .
4,355,309 10/1982 Hughey et al. .
4,371,814 2/1983 Hannas .
4,382,400 5/1983 Sutzman .
4,384,844 5/1983 Shiragaki et al. .
4,402,649 9/1983 Laurel .
4,408,150 10/1983 Hinesley et al. .
4,413,211 11/1983 Fowler .
4,430,576 2/1984 Fowler .
4,465,956 8/1984 Fowler .
4,538,973 9/1985 Angott et al. .
4,548,554 10/1985 Angott .
4,560,909 12/1991 Peil .
4,621,992 11/1986 Angott .
4,684,822 8/1987 Angott .
4,686,380 8/1987 Angott .
4,689,533 8/1987 Yang .
4,716,409 12/1987 Hart et al. .
4,719,446 1/1988 Hart .
4,768,926 9/1988 Gilbert .
4,780,872 10/1988 Masuda et al. ................ 340/825.52
4,818,920 4/1989 Jacob .
4,935,736 6/1990 Meierdierick .
4,990,908 2/1991 Tung .
5,033,113 7/1991 Wang .
5,041,825 8/1991 Hart et al. .

FOREIGN PATENT DOCUMENTS

92/01968 2/1992 World Int. Prop. O. ...... 340/825.72

*Primary Examiner*—Edward K. Look
*Assistant Examiner*—Mark Sgantzos
*Attorney, Agent, or Firm*—Rankin, Hudak & Hill

[57] ABSTRACT

An enclosure is provided for the installation of a ceiling fan remote control circuit in a ceiling fan. A generally rectangular box encloses the circuit and is installed inside a canopy of a ceiling fan so that it rests above a support conduit and below a mounting plate. The enclosure is compact and inexpensive to manufacture and permits existing fans to be converted to remote control without requiring additional space. No adapters or additional part are needed and the appearance of the fan is not altered.

10 Claims, 2 Drawing Sheets

CONTROLLER FOR REMOTE CONTROL CEILING FAN

BACKGROUND OF THE INVENTION

Field of the Invention

This invention relates generally to the field of ceiling fans and specifically to a compact remote controller for a ceiling fan.

Description of Related Art

Ceiling fans have enjoyed renewed popularity in recent years. They are common features in many new homes and businesses. Because of their popularity, many ceiling fans are adapted to be installed in existing structures. Typically, such a retrofit installation replaces an existing ceiling light fixture controlled by a wall switch, and many ceiling fans thus include one or more lights. The advantage of replacing an existing light fixture is that an electrical outlet box is in place in the ceiling so that new electrical wires do not need to be installed to power the fan, thereby reducing the amount of damage to walls and ceilings.

In most retrofit installations, fans are provided with pull chains that can be used to select one of two or three fan speeds as well as to turn the fan on and off. A switch may also be provided to reverse the direction of rotation of the fan. Fans which include lights are usually provided with a second pull chain to turn the lights on and off. Fans which are controlled by chains and switches mounted on the fan itself receive power from the electrical circuit which powered the light in the fixture which was replaced by the fan.

In some installations, switches and chains on the fans are not accessible. For example, in a bedroom with a high ceiling or in a restaurant where fans are located over dining tables, it is impractical to use fan mounted control switches. In other installations, the use of pull chains can be very inconvenient due to the location of the fan. The action of the turning fan blades may also make it dangerous to operate the pull chains, particularly if the chains are short. Furthermore, pull chains sometimes break, making operation of the fan very difficult.

The wall switch which was previously associated with the old ceiling light can be used to control power to the fan and lights, but, independent control of the fan and lights, and speed control of the fan is not be possible without installing more electrical wires or installation of a complicated and expensive control circuit. It is also convenient for the user to operate the fan and the light from any location in the room, not just from the location of the wall switch.

Therefore, it is desirable to have a means to independently control the ceiling fan and its lights from a location remote from the fan. A remote controller operated by a wireless transmitter can be connected between the power wires and the fan wires, however, a location must be provided to mount the controller. U.S. Pat. No. 4,548,554 to Angott shows a controller in an enclosure which is generally circular except that a slot extends from one edge past the center of the circle. The fan is installed so that it hangs from a central support rod which is mounted to a box in the ceiling. The controller enclosure is mounted to the box with the rod extending through the slot and a canopy covers the assembly. Due to the size and configuration of the controller enclosure, it may not fit within the canopy in many installations, and spacers are provided between a mounting bracket and the enclosure. Screws fasten the bracket to the box and secure the enclosure between the bracket and the box. Again, a canopy covers the assembly.

SUMMARY OF THE INVENTION

The present invention provides a ceiling fan controller for mounting in a fan assembly, which includes an enclosure having generally rectangular top and bottom walls, the bottom wall being adapted to rest above a central support conduit of the fan assembly and the top wall being adapted to rest below an overhead support mounting plate of the fan assembly; and means to admit electrical conductors from the enclosure through at said central support conduit.

The controller is concealed by the canopy. A controller circuit is enclosed in the enclosure and connected between power supply wires and fan wires. An antenna extends from the enclosure, and an aperture is provided in the enclosure to permit access to a code selector switch of the controller.

Also disclosed is a fan assembly including a mounting plate adapted to be connected to an overhead support and a generally frusto-conical canopy suspended from the mounting plate. A central support conduit extends through and is supported by the canopy, and a fan and light assembly is supported by the support conduit. A fan and light controller has electrical conductors extending therefrom. A generally rectangular parallelpiped controller enclosure is adapted to enclose the controller, which includes top and bottom walls, the bottom wall being adapted to rest above the support conduit and the top wall being adapted to rest below the mounting plate; and means to admit the electrical conductors through said central support conduit.

The configuration of the enclosure permits it to be easily installed in most standard ceiling fans without additional hardware or adapters. The enclosure itself is simple and aesthetically appealing and permits the canopy to be mounted flush with the ceiling.

DESCRIPTION OF THE PREFERRED EMBODIMENT

Figure 1:
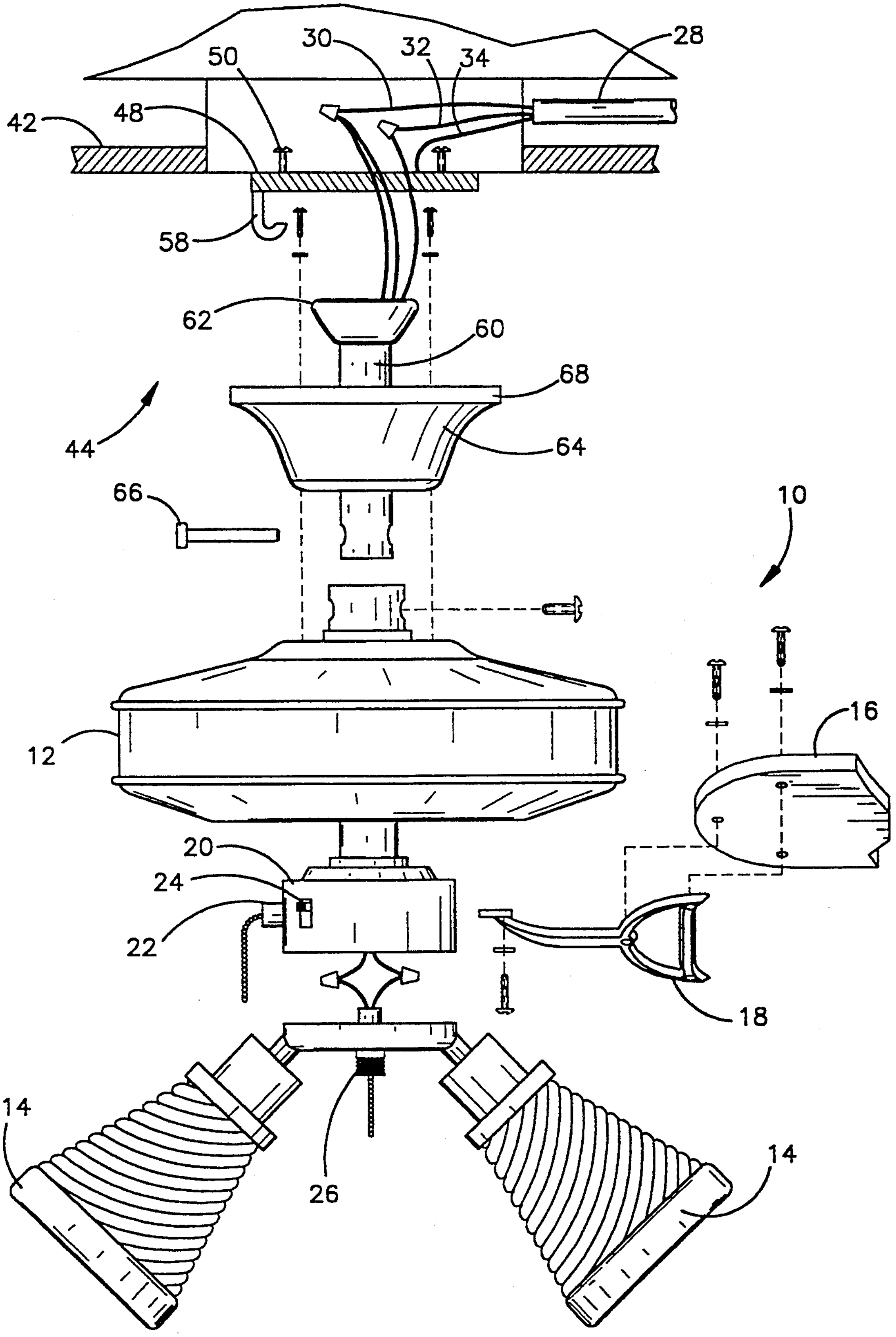
FIG. 1 shows an exploded side elevational view of a ceiling fan assembly according to the invention.

Referring to FIG. 1, a typical ceiling fan assembly 10 is shown. Many of the elements of the ceiling fan assembly 10 are well known in the art, so the fan assembly need not be described in detail. The fan assembly 10 includes a reversible, variable-speed motor 12 and lights 14. Fan blades 16 are connected to the motor 12 by arms 18 so that the motor can drive the blades so as to cause an air flow. The lights 14 are mounted on a switch housing 20 which is mounted beneath the motor. The switch housing 20 includes switching devices which can be used to control the motor 12 and the lights 14. For example, a multiple position fan speed control switch 22 may be provided within the switch housing 20. The control switch 22 is operated by a pull chain to switch the motor between an "off" condition and high, medium and low "on" speeds. A reversing switch 24 which may also be provided in the switch housing 20 is connected to reverse the direction of rotation of the motor 12. A light switch 26 is also connected to the lights and is operated by a pull chain to switch the lights between "on" and "off" conditions.

Figure 2:
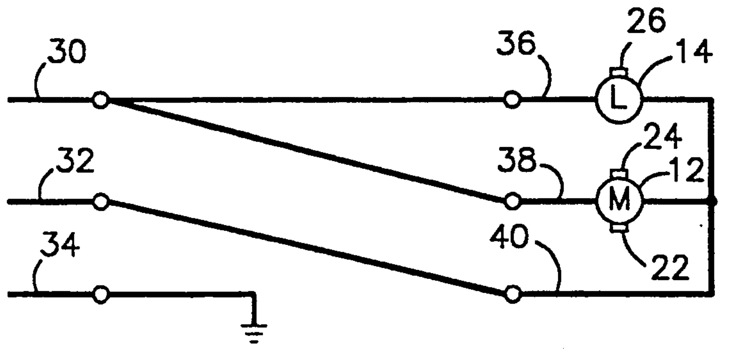
Fig.2 (PRIOR ART)
FIG. 2 shows a schematic wiring diagram of a standard ceiling fan circuit.

In accordance with the prior art, power is supplied to the motor 12 and the lights 14 from a standard electrical supply cable 28 including two supply conductors 30 (black) and 32 (white) and a ground 34 (green or bare). Referring to FIG. 2, the black supply conductor 30 is connected to a light feed conductor 36 (blue) and to a motor feed conductor 38 (black). The white supply conductor is connected to a common feed conductor 40 (white) for the motor and the lights. The ground 34 is connected to the fan assembly 10.

Figure 3:
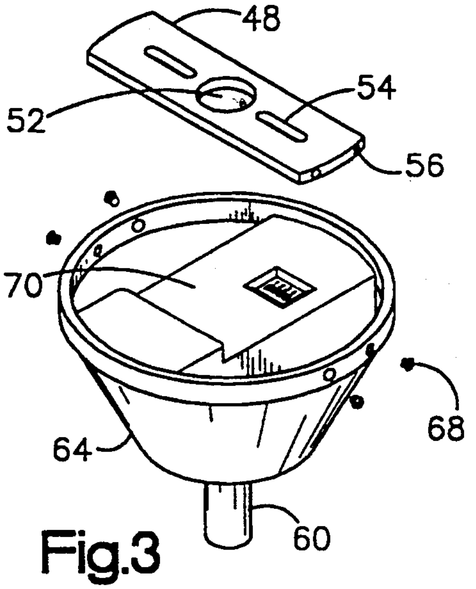
FIG. 3 shows a perspective view of the controller installed in a canopy of the fan.

Returning to FIG. 1, the fan assembly 10 is suspended from a ceiling 42 by a support assembly 44. An outlet box 46 is mounted in a hole in the ceiling 42 so as to be more or less flush with the surface of the ceiling. The supply cable 28 enters the outlet box 46 through an opening in one side of the box. A mounting plate 48 is secured to the open lower portion of the box 46 by screws 50. The mounting plate 48, which can be seen more clearly in FIG. 3, is an elongated, generally rectangular plate having a central hole 52 through which electrical conductors extend. Mounting holes 54 for the screws 50 are also provided on each side of the central hole 52. One or both ends of the mounting plate 48 are also provided with canopy mounting holes 56. Returning to FIG. 1, the mounting plate may also be provided with a canopy mounting hook 58.

A central support conduit 60 comprises a rigid tube for admitting electrical conductors therethrough from the outlet box 46 to the motor 12 and the lights 14. A ball 62 or flange is provided at the upper end of the conduit 60. The lower end of the conduit 60 is inserted through a central hole in a canopy 64 and the conduit ball 62 engages to outer periphery of the hole to hold the conduit extending downwardly from the bottom of the canopy. The canopy 64 is rigid to support the weight of the fan assembly and is generally frusto-conical in shape so as to conceal parts of the mounting assembly 44. The fan assembly is supported at the lower end of the support conduit 60 by a pin 66 or other mounting means. The ball 62 is seated in the canopy 64 so as to rigidly support upper end of the fan assembly 10.

The fan assembly 10 is secured to the mounting plate 48 by canopy screws 68 inserted through holes around the edge of the canopy 64 and threaded into the canopy mounting holes 56 in the mounting plate. Alternatively, one side of the canopy 64 may be suspended from the canopy hook 58 and canopy screws 68 threaded into the mounting holes 56 through holes on one edge of the canopy.

The canopy 64 should be as small as possible, not only for reasons of appearance, but also to keep the fan assembly as high as possible. Most ceiling fans are used in residential homes where ceilings may be fairly low. The fan assembly with the under-hanging lights must be mounted as close the ceiling as possible to provide clearance so that persons of average height may walk underneath the fan without injury when the fan is operating. Thus, a small canopy is highly desirable. However, the small size of the canopy 64 complicates its use as an enclosure for a remote controller.

Figure 4:
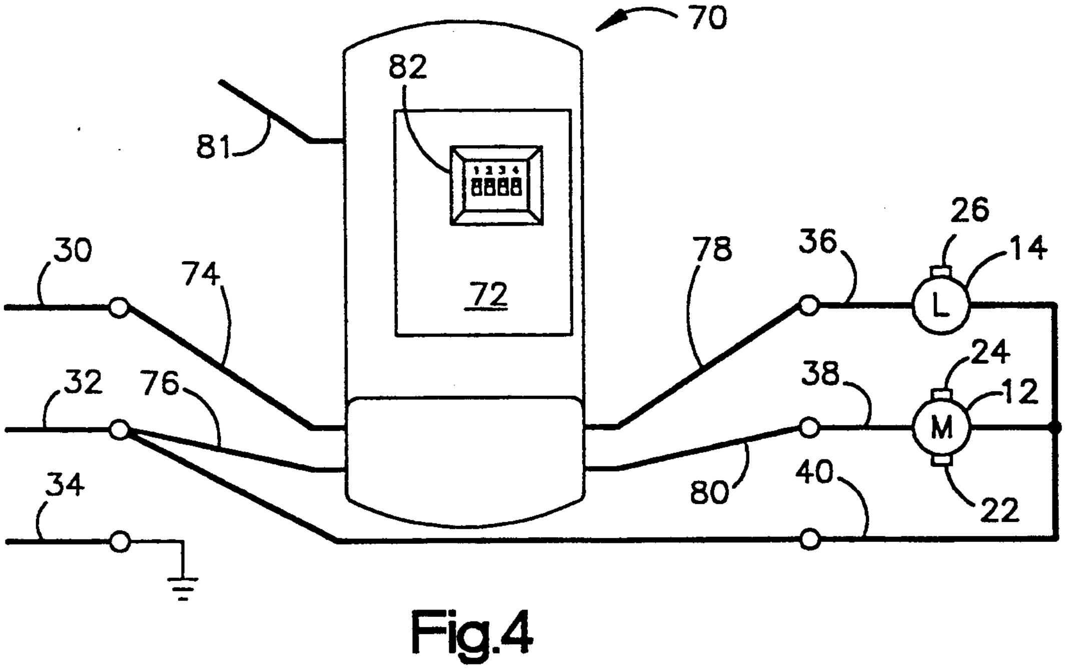
FIG. 4 shows a schematic wiring diagram of a controller according to the present invention installed in a fan.

Referring to FIG. 4, the present invention provides a controller enclosure 70 comprising a generally parallelpiped box having a remote control circuit 72 inside. The remote control circuit has conductors connected thereto which are used to connect the circuit 72 between the power supply cable and the motor 12 and lights 14. A controller power conductor 74 (black) is admitted through a wall of the box and is connected to the black supply conductor 30. Another controller power conductor 76 (white) is connected to the white supply conductor 32. The white supply 32 remains connected to the common feed conductor 40. A blue light control conductor 78 is connected to the blue light feed 36 and a red fan control conductor 80 is connected to the black fan feed 38.

An antenna 81 extends from the control circuit through a wall of the enclosure. A code select switch 82 is provided on the control circuit 72, and the enclosure 70 is provided with an aperture 84 for access to the select switch.

Figure 5:
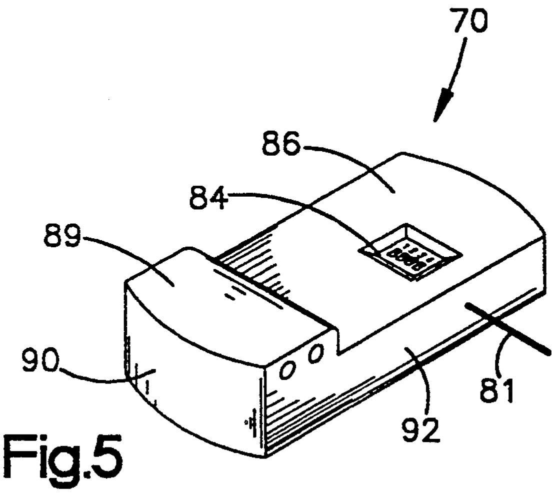
FIG. 5 shows a perspective view of a controller according to the present invention.

Referring to FIG. 5, the enclosure 70 has generally rectangular top and bottom walls 86 with curved end walls 90 and generally flat side walls 92. The aperture 84 is provided in the top wall. A ledge 89 is provided at one end to permit space for a transformer inside the enclosure 70.

Overheating is avoided by the configuration of the compact enclosure 70. The enclosure is generally in the form of a parallelpiped with generally flat side walls 92, providing clearance along each side between he enclosure and the canopy. The clearance provides for heat dissipation which minimizes overheating.

The curved end walls 90 conform to the inner circumference of the canopy 64 and permit the enclosure to be large enough to contain the control circuits yet fit within the generally frusto-conical canopy. Generally rectangular, flat side walls 92 also have rounded bottom corners adapted to rest in the canopy 64 and allow the enclosure to be as large as possible yet fit within the canopy.

Returning to FIG. 3, the enclosure 70 is located within in the canopy 64. If the fan 10 has been previously installed, the remote controller can be retrofit into most existing fans. Due to the unique size and configuration of the enclosure 70, the remote controller of the present invention can be installed in existing ceiling fans to provide the convenience of remote control operation.

To install the enclosure 70, the canopy 64 must be removed from the mounting plate by removing the canopy screws 68. After the control circuit is connected as shown in FIG. 4, the enclosure 70 is more or less centered in the canopy 64 so that it rests above the conduit 60 and ball 62. The enclosure is preferably positioned so that its length is normal to the length of the mounting plate 48. Thus, if the ledge 89 is provided, it will not interfere with mounting of the fan 10 since the ledge fits to the side of the mounting plate 48. The canopy 64 is secured to the mounting plate 48 as discussed above. The control circuit and enclosure can thus be retrofit in an existing fan installation or assembled with a newly installed fan. The shape and compact design of the enclosure 70 allows it to fit in an existing space in the canopy so that the canopy can be replaced flush against the ceiling. No additional parts or hardware are necessary for mounting.

The control circuit 72 is adapted to receive radio control signals from a remote transmitter (not shown) to control functions of the fan 10 such as motor speed and light illumination. Preferably, the control circuit 72 is capable of receiving signals from the remote transmitter to turn the fan motor 12 on and off and to control the speed of the fan motor through at least three different speeds. In addition, the control circuit 72 is capable of receiving signals from the remote transmitter to turn the light 14 on and off and to provide several different levels of illumination through discrete dimming steps. Thus, a simple installation is provided which does not require addition space or modification of an existing fan assembly. The enclosure is of a simple configuration which permits uncomplicated circuit designs to be installed therein and minimizes manufacturing costs.

The present invention also provides the capability of special features which were not presented by the prior art. For example, the control circuit can be programmed so that the lights 14 will flash when the control circuit has received a command to change the speed of the fan motor 12. Changes in fan motor speed are often not immediately perceptible to the user, and this feature allows the user to confirm instantly that a fan motor speed command has been received by the control circuit and eliminates unnecessary actuation of the motor speed control by the user.

The present disclosure describes several embodiments of the invention, however, the invention is not limited to these embodiments. Other variations are contemplated to be within the spirit and scope of the invention and appended claims.

What is claimed is:

1. A ceiling fan controller for mounting in a ceiling-mounted canopy of a fan assembly, comprising:

an enclosure of a generally rectangular parallelpiped shape having generally rectangular top and bottom walls, the bottom wall providing means for resting the enclosure above a central support conduit of the fan assembly and the top wall providing means for positioning the enclosure below an overhead support mounting plate of the fan assembly, the enclosure having curved end walls on both ends to conform to the shape of the canopy; and means to admit electrical conductors from the enclosure through a central support conduit.

2. A controller according to claim 1, further comprising a remote control circuit enclosed in the enclosure.

3. A controller according to claim 1, further comprising means to admit an antenna from the enclosure.

4. A controller according to claim 1, further comprising an aperture to permit access to a code select switch within the enclosure.

5. A controller according to claim 1, wherein the enclosure has generally flat side walls.

6. A controller according to claim 1, wherein the enclosure includes a ledge portion extending above, the generally rectangular parallelpiped shape, the ledge portion providing means for fitting the enclosure next to a mounting plate.

7. A controller according to claim 2, wherein the remote control circuit includes means for controlling the speed of a motor fan and means for controlling the illumination of a light, and wherein the speed controlling means flashes the lights when the fan motor speed control is changed.

8. In a ceiling fan assembly including:

a mounting plate having means for connecting to an overhead support;

a generally frusto-conical canopy suspended from the mounting plate;

a central support conduit and supported by the canopy;

a fan and light assembly supported by the support conduit; and a fan and light controller having electrical conductors extending therefrom, an improved controller enclosure having means for enclosing the controller, the enclosure comprising:

a housing of a generally rectangular parallelpiped shape having top and bottom walls, the bottom wall providing means for resting the enclosure above the support conduit and the top wall providing means for positioning the enclosure below the mounting plate, the housing having curved end walls on both ends to conform to the shape of the canopy; and means to admit the electrical conductors through said central support conduit.

9. A fan assembly according to claim 8, wherein the enclosure has generally flat side walls.

10. A fan assembly according to claim 8, wherein the enclosure includes a ledge portion extending above, the generally rectangular parallelpiped shape, the ledge portion providing means for fitting the enclosure next to the mounting plate.

* * * * *